United States Patent [19]

Swain et al.

[11] Patent Number: 5,524,342
[45] Date of Patent: Jun. 11, 1996

[54] METHODS FOR SHRINKING NICKEL ARTICLES

[75] Inventors: Eugene A. Swain, Webster; William G. Herbert, Williamson; Gary J. Maier; Loren E. Hendrix, both of Webster, all of N.Y.

[73] Assignee: Xerox Corporation, Stamford, Conn.

[21] Appl. No.: 249,594

[22] Filed: May 27, 1994

[51] Int. Cl.$^6$ ............................... B23P 11/00; C25D 1/02
[52] U.S. Cl. .................... 29/895.212; 29/447; 148/518; 148/519; 205/73; 205/224
[58] Field of Search .................... 205/67, 69, 73, 205/224; 148/516, 518, 519, 563; 29/447, 895.212

[56] References Cited

U.S. PATENT DOCUMENTS

| | | | |
|---|---|---|---|
| 3,426,119 | 2/1969 | Chapman et al. | 264/230 |
| 3,579,805 | 5/1971 | Kast | 148/529 |
| 3,844,906 | 10/1974 | Bailey et al. | 204/9 |
| 3,879,828 | 4/1975 | Troost | 29/895.212 |
| 3,950,839 | 4/1976 | DuPree et al. | 29/447 |
| 4,153,453 | 5/1979 | Hart et al. | 75/123 J |
| 4,198,081 | 4/1980 | Harrison et al. | 285/381 |
| 4,265,990 | 5/1981 | Stolka et al. | 430/59 |
| 4,390,611 | 6/1983 | Ishikawa et al. | 430/5 |
| 4,501,646 | 2/1985 | Herbert | 204/4 |
| 4,551,404 | 11/1985 | Hiro et al. | 430/59 |
| 4,588,667 | 5/1986 | Jones et al. | 430/73 |
| 4,596,754 | 6/1986 | Tsutsui et al. | 430/58 |
| 4,631,094 | 12/1986 | Simpson et al. | 148/11.5 |
| 4,797,337 | 1/1989 | Law et al. | 430/58 |
| 4,980,960 | 1/1991 | Usui et al. | 29/447 |
| 5,058,936 | 10/1991 | Kapgan et al. | 285/382 |
| 5,167,987 | 12/1992 | Yu | 427/171 |
| 5,177,854 | 1/1993 | Herbert, Jr. et al. | 29/407 |
| 5,233,921 | 8/1993 | John | 101/349 |

Primary Examiner—John Niebling
Assistant Examiner—William T. Leader
Attorney, Agent, or Firm—Zosar S. Soong

[57] ABSTRACT

A method is disclosed for heating a portion of an article comprised of nickel, formed by electrodeposition, and possessing an internal stress sufficient to shrink the outer cross-sectional dimension upon application of heat, thereby shrinking the outer cross-sectional dimension of the heated portion. The method may be used to couple the article to other members such as end flanges without the use of an adhesive.

18 Claims, 1 Drawing Sheet

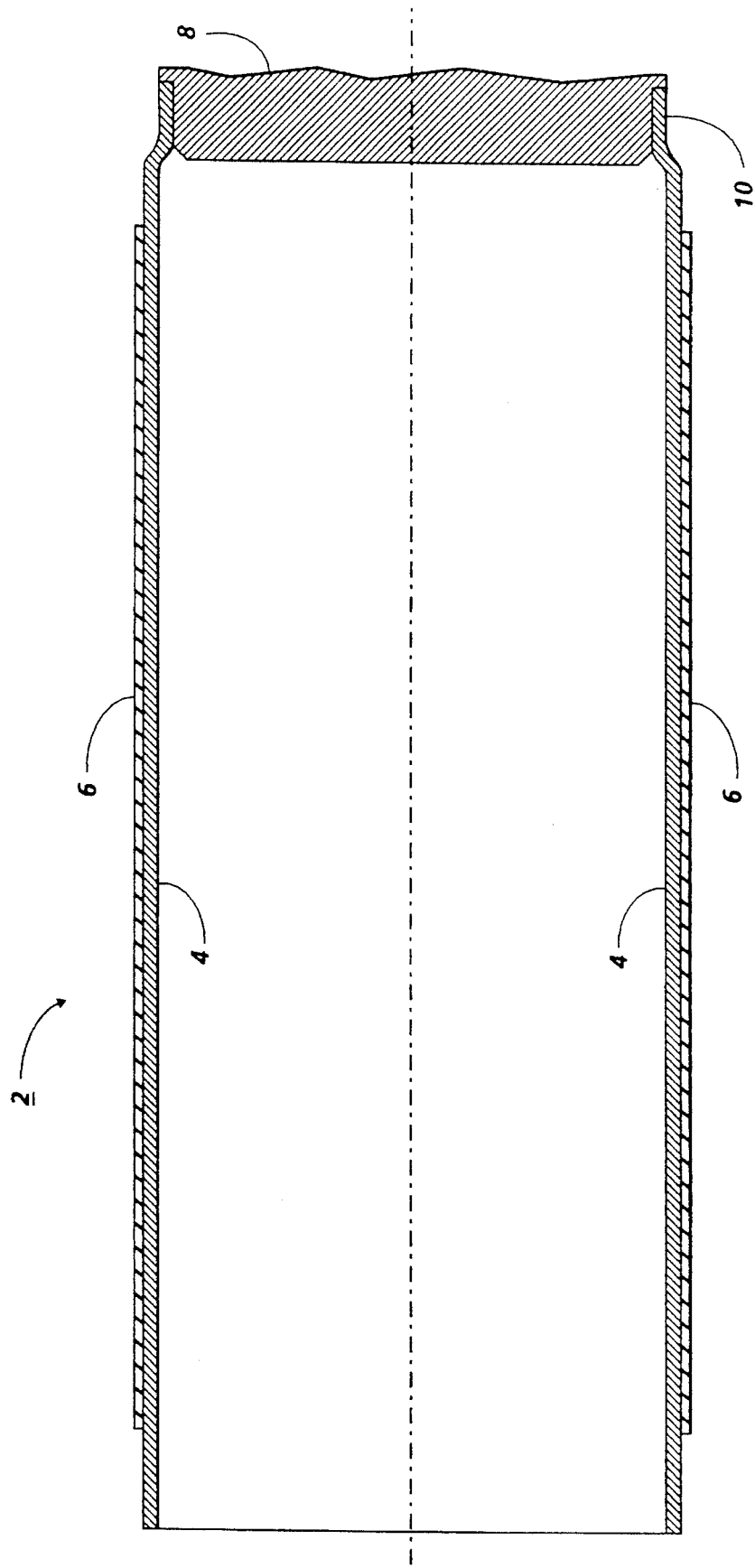

METHODS FOR SHRINKING NICKEL ARTICLES

This invention relates generally to methods for shrinking articles comprised substantially of nickel, and more particularly to methods for heat shrinking articles comprised substantially of nickel, wherein the article is formed by electrodeposition to possess an internal stress sufficient to shrink the outer cross-sectional dimension upon application of heat. The present invention may be used for example in the fabrication of photosensitive or photoconductive members. Photosensitive members may be employed in electrostatographic printing and/or copying devices.

In reducing the manufacturing costs of a photoreceptor, the cost of the photoreceptor substrate is a key target. Because of the relatively high cost of aluminum and the cost of diamond turning aluminum substrates, nickel substrates formed by electrodeposition, especially electroforming, is becoming increasingly attractive. Nickel substrates are generally less expensive to fabricate because nickel is less expensive than aluminum and the nickel substrates may be fabricated in embodiments with a surface which obviates the need for a diamond turning step. Another cost component of photoreceptor fabrication is that of the end flange and its assembly. Conventionally, end flanges usually made of plastic are glued to the ends of the photoreceptor with an adhesive. Gluing is accomplished in one or more steps on a complex assembly machine. One of the largest problems is that of maintenance, especially related to the adhesive system. Frequent cleaning and adjustment are required, which lead to significant downtime and greatly increased maintenance costs. There is a need for a method to attach the end flanges to a photoreceptor which minimizes or eliminates the use of adhesives.

Usui et al., U.S. Pat. No. 4,980,960, discloses a method of fixing a pipe by means of a clamp body. There is employed a shape memory alloy such as titanium-nickel.

Herbert, U.S. Pat. No. 4,501,646, discloses an electroforming process.

Simpson et al., U.S. Pat. No. 4,631,094, discloses a method of processing a nickel/titanium-based shape memory alloy and an article produced therefrom.

John, U.S. Pat. No. 5,233,921, discloses a shape memory alloy comprised of nickel in a printing machine system and inking method.

Kapgan et al., U.S. Pat. No. 5,058,936, discloses a technique for making a connection to an object, for example a tube, comprising positioning a shape memory alloy collar around the tube.

SUMMARY OF THE INVENTION

In embodiments of the present invention, there is provided a method comprising heating a portion of an article comprised of nickel, formed by electrodeposition, and possessing an internal stress sufficient to shrink the outer cross-sectional dimension upon application of heat, thereby shrinking the outer cross-sectional dimension of the heated portion.

In embodiments, there is also provided a method comprising: (a) electroforming on a mandrel a hollow cylinder comprised of nickel, and possessing an internal stress sufficient to shrink the outer cross-sectional dimension of the cylinder upon application of heat; (b) removing the cylinder from the mandrel; (c) positioning a portion of a member into an end of the cylinder; and (d) heating the end region of the article adjacent the end flange to shrink the cross-sectional dimension of the article's end region, thereby contacting the inner surface of the article against the outer surface of the member.

In embodiments, there is further provided a method comprising: (a) electroforming on a mandrel a hollow cylinder comprised of nickel, and possessing an internal stress sufficient to shrink the outer cross-sectional dimension of the cylinder upon application of heat; (b) removing the cylinder from the mandrel; (c) heating an end region of the cylinder, thereby shrinking the outer cross-sectional dimension of the end region; and (d) positioning a portion of a member into the shrunken end region, wherein the portion of the member has an outer cross-sectional dimension larger than the inner cross-sectional dimension of the shrunken end region, thereby expanding the shrunken end region.

BRIEF DESCRIPTION OF THE DRAWINGS

Other aspects of the present invention will become apparent as the following description proceeds and upon reference to the following preferred embodiment: FIG. 1 represents a schematic, cross-sectional view along the length of a photoreceptor having a flange coupled to an end of the photoreceptor.

DETAILED DESCRIPTION

The nickel article is formed by electrodeposition, preferably by electroforming, to possess an internal stress sufficient to shrink the outer cross-sectional dimension of the article upon application of heat. The article preferably does not become brittle when subjected to heating. The internal stress of an article, prepared by for example electroforming, includes tensile stress and compressive stress. In tensile stress, the material (electroform/deposited material/part) is smaller than it would be if it had zero stress. This is believed to be due to the existence of many voids in the metal lattice of the electroformed deposit with a tendency of the deposited material to contract to fill the voids. In compressive stress, the material (electroform/deposited material/part) is larger than it would be if it had zero stress. This is believed to be due to the presence of many extra atoms in the metal lattice instead of voids, such as metal atoms or foreign materials with a tendency for the electroformed material to expand and occupy a larger space. The numerical value for the internal stress may be expressed in pounds per square inch ("psi") and is a net value of tensile stress, expressed in a positive psi value, and compressive stress, expressed in a negative psi value. It is believed that there is no method at this time to measure the magnitude of either the tensile stress or the compressive stress. However, it is possible to measure internal stress, which is the net value of the positive tensile stress and the negative compressive stress. A spirocontractometer may be employed to measure the internal stress. In embodiments of the present invention, the internal stress may range for example from about −1 to about −5,000 psi, preferably from about −100 to about −2,000 psi, and especially about −200 to about −1,000 psi. The amount of stress needed will depend on the amount of shrinkage needed and the amount of heat (time and temperature). It may be convenient to use, for example, several tens of thousands of pounds per square inch of compressive stress if one needs a lot of shrinkage (e.g., 0.005 inch on the diameter or cross-section) and is working with a small diameter (e.g., less than one inch) and is applying the heat for only a few milliseconds and the temperature is low.

It is not known with certainty why nickel articles may shrink upon application of heat, but it is reasonable to assume that the larger atoms (extra atoms) in the matrix become more efficiently arranged and that some atoms may actually move to the grain pattern boundaries where they are isolated from the metal atom grain pattern.

The article is formed on the mandrel in any suitable electrodeposition process including electroplating and electroforming. A typical electrodeposition cycle, especially electroforming, is illustrated in Bailey et al., U.S. Pat. No. 3,844,906, the disclosure of which is totally incorporated by reference. An electroforming cycle is comprised for example of different cells such as the preheat cell, the metal deposition vessel, the solution recovery cell, and the cooling cell.

Preferred electroforming or plating solutions are disclosed in Herbert, U.S. Pat. No. 4,501,646, the disclosure of which is totally incorporated by reference. In preferred embodiments of the present invention, the electroforming or plating solutions may have the following composition:

Total Deposition Nickel: 9.0 to 15.0 oz/gal (the recited concentration for the Total Deposition Metal refers to the nickel ions in solution without any counterions and includes the nickel component of the halide compound disclosed herein as $NiX_2 \cdot 6H_2O$);

$NiX_2 \cdot 6H_2O$: 0.11 to 0.23 moles/gal, where X is a halogen such as fluorine, chlorine, iodine, and bromine; and Buffering Agent (such as $H_3BO_3$): 4.5 to 6.0 oz/gal.

Optionally, there is continuously charged to the above solution about 1.0 to $2.0 \times 10_{-4}$ moles of a stress reducing agent per mole of deposition metal electrolytically deposited from the solution. Suitable stress reducing agents include sodium sulfobenzimide (saccharin), 2-methylbenzenesulfonamide, benzene sulfomate, naphthalene trisulfomate, and mixtures thereof.

For continuous, stable operation with high throughput and high yield of acceptable electroformed articles, a nickel sulfamate solution is preferred and is maintained at an equilibrium composition within the electroforming zone. The preferred nickel sulfamate solution comprises:

Total Nickel: 10.0 to 14.0 oz/gal (the recited concentration for the Total Nickel refers to the nickel ions in solution without any counterions and includes the nickel component of the halide compound disclosed herein as $NiCl_2 \cdot 6H_2O$);

Chloride as $NiCl_2 \cdot 6H_2O$: 1.6 to 1.7 oz/gal;

$H_3BO_3$: 5.0 to 5.4 oz/gal;

Weight Ratio (Chloride as $NiCl_2 \cdot 6H_2O$)/Total Nickel: 0.12±0.02;

pH: 3.8 to 4.1; and

Surface Tension (measured by a Surface Tensionometer): 33 to 37 dynes/cm$^2$.

Additionally, from about 1.3 to $1.6 \times 10^{-4}$ moles of a stress reducing agent per mole of nickel electrolytically deposited from said solution is continuously charged to said electroforming solution.

It has been found that the pH can be essentially maintained within the range set forth above by ensuring a steady state concentration of buffering agent in the solution, generally boric acid ($H_3BO_3$), within the range of 5.0 to 5.4 oz/gal.

Control of the surface tension of the electroforming or plating solution may be necessary in order to substantially reduce surface flaws, especially pitting in the electrodeposited article. The surface tension of the solution preferably ranges from about 33 to about 37 dynes/cm$^2$ in order to assure a high rate of production with minimum rejects because of surface flaws. The surface tension of the solution can be maintained within this range by maintaining a steady state concentration of an anionic surfactant such as sodium lauryl sulfate, DUPONOL 80™, a sodium alcohol sulfate, PETROWET R™, a sodium hydrocarbon sulfonate (said latter two surfactants being available from E. I. du Pont de Nemours & Co., Inc.), and the like, ranging from 0 to 0.014 oz/gal within the solution, and preferably, by maintaining a steady state concentration of from 0 to 0.007 oz/gal of surfactant therein.

The temperature of the electroforming or plating solution may be between about 100° and 160° F. and preferably is between about 135° and 160° F. Current density supplied by a DC source is for example about 20 to 600 amperes per square foot of mandrel surface.

Because of the effects of both temperature and solution composition on the final product, it is preferred to maintain the electrodeposition solution in a constant state of agitation thereby substantially precluding localized hot or cold spots, stratification and inhomogeneity in composition. Agitation may be obtained by continuous rotation of the mandrel and by impingement of the solution upon the mandrel and cell walls as the solution is circulated through the system. Generally, the solution flow rate across the mandrel surface can range from about 4 to 10 linear feet/second. For example, at a current density of about 300 amps/ft$^2$ with a desired solution temperature range within the cell of about 150° to 160° F., a flow rate of about 15 gal/min of solution may be sufficient to effect proper temperature control. The combined effect of mandrel rotation and solution impingement may assure uniformity of composition and temperature of the electrodeposition solution within the electrodeposition cell.

Processes for electroforming articles on the mandrel are known and described, for example, in U.S. Pat. Nos. 4,501,646 and 3,844,906, the disclosures of which are totally incorporated by reference. The electroforming process of this invention may be conducted in any suitable electroforming device. For example, a plated cylindrically shaped mandrel having an ellipsoid shaped end portion may be suspended vertically in an electroplating tank. The electrically conductive mandrel plating material should be compatible with the metal plating solution. For example, the mandrel plating may be chromium. The top edge of the mandrel may be masked off with a suitable non-conductive material, such as wax to prevent deposition. The electroplating tank is filled with a plating solution and the temperature of the plating solution is maintained at the desired temperature such as from about 45° to about 65° C. The electroplating tank can contain an annular shaped anode basket which surrounds the mandrel and which is filled with metal chips. The anode basket is disposed in axial alignment with the mandrel. The mandrel is connected to a rotatable drive shaft driven by a motor. The drive shaft and motor may be supported by suitable support members. Either the mandrel or the support for the electroplating tank may be vertically and horizontally movable to allow the mandrel to be moved into and out of the electroplating solution. Electroplating current such as from about 25 to about 400 amperes per square foot can be supplied to the electroplating tank from a suitable DC source. The positive end of the DC source can be connected to the anode basket and the negative end of the DC source connected to a brush and a brush/split ring arrangement on the drive shaft which supports and drives the mandrel. The electroplating current passes from the DC source to the anode basket, to the plating solution, the mandrel, the drive shaft, the split ring, the brush, and back to the DC source. In operation, the mandrel is lowered into the electroplating tank and continuously rotated about its vertical axis. As the mandrel rotates, a layer of electroformed metal is deposited on its outer surface. When the layer of deposited metal has reached the desired thickness, the mandrel is removed from the electroplating tank.

A typical electrolytic cell for depositing metals such as nickel may comprise a tank containing a rotary drive means including a mandrel supporting drive hub centrally mounted thereon. The drive means may also provide a low resistance conductive element for conducting a relatively high amperage electrical current between the mandrel and a power supply. The cell is adapted to draw, for example, a peak current of about 3,000 amperes DC at a potential of about 18 volts. thus, the mandrel comprises the cathode of the cell. An anode electrode for the electrolytic cell comprises an annular shaped basket containing metallic nickel which replenishes the nickel electrodeposited out of the solution. The nickel used for the anode comprises sulfur depolarized nickel. Suitable sulfur depolarized nickel is available under the trade names, "SD" Electrolytic Nickel and "S" Nickel Rounds from International Nickel Co. Nonsulfur depolarized nickel can also be used such as carbonyl nickel, electrolytic nickel and the like. The nickel may be in any suitable form or configuration. Typical shapes include buttons, chips, squares, strips and the like. The basket is supported within the cell by an annular shaped basket support member which also supports an electroforming solution distributor manifold or sparger which is adapted to introduce electroforming solution to the cell and effect agitation thereof. A relatively high amperage current path within the basket is provided through a contact terminal which is attached to a current supply bus bar.

The article has a composition comprised of nickel in an amount preferably ranging from about 90 to about 99.9% by weight, and more preferably ranging from about 98.0 to about 99.9% by weight, and especially ranging from about 99.7 to about 99.9% by weight. In embodiments, the nickel article has a composition further comprised of carbon, sulfur, and optionally cobalt in the following amounts: carbon in an amount ranging for example from about 0.001 to about 0.006% by weight, and preferably from about 0.002 to about 0.004% by weight; sulfur in an amount ranging for example from about 0.001 to about 0.006% by weight, and preferably from about 0.002 to about 0.004% by weight; and optionally cobalt in an amount ranging for example from about 0.02 to about 0.20% by weight, and preferably from about 0.04 to about 0.10% by weight. The source for the carbon and sulfur atoms in the article is the stress reducing agents described herein which may be employed in the electrodeposition bath. Cobalt is an "impurity" in the nickel anode material and nickel salts (chemicals) used to make up the electrolyte. Cobalt is present because it is difficult to separate from nickel as nickel and cobalt have very similar chemistries. Additionally, it is believed that cobalt levels up to about several percentages would not substantially change the nickel shrinkage effect due to the similar chemistries of cobalt and nickel. In embodiments, there may be trace amounts of iron, copper, lead, gold, and/or silver; one or more of these impurities may be present in an amount less than about 0.0001% by weight, and preferably ranging from about 0.0001 to about 0.0008% by weight.

The article may have any suitable configuration and dimensions. The article can be flexible or rigid, and may be a plate, a cylindrical drum, a scroll, an endless flexible belt, or the like. The article may have a wall thickness ranging from about 0.025 mm to about 100 mm. Preferably, the article is in the form of a hollow cylinder having the following illustrative dimensions: an inside diameter ranging from about 5 mm to about 760 mm, an outside diameter ranging from about 5.025 mm to about 775 mm, a length ranging from about 175 mm to about 1100 mm, and a wall thickness ranging from about 0.025 mm to about 100 mm.

Any suitable method and apparatus may be optionally employed to assist in the removal of the electroformed article from the mandrel. For example, a mechanical parabolic end parting fixture may be employed to grasp the electroform. Also, a vacuum cup may be placed under the article. A vacuum would be generated by the use of air pressure or vacuum pump. In a different approach, vibrational energy, especially ultrasonic energy, is used to cause the electroform to separate from the mandrel. In one embodiment, an ultrasonic bath is used during or after the parting gap is established to assist in removal of the electroform. It is also possible to use a vibrator which contacts the electroform or the mandrel.

In embodiments, an optional effective parting gap may be created between a portion of the electroform and the mandrel to facilitate separation. Preferably, the parting gap ranges from about 0.1 mm to about 1 cm, and more preferably from about 0.1 mm to about 5 mm in width separating the electroform and the mandrel. The parting gap may be created by any suitable method including reliance on differences in the coefficients of thermal expansion/cooling between the mandrel and the article as illustrated in Bailey et al., U.S. Pat. No. 3,844,906 and Herbert, U.S. Pat. No. 4,501,646, the disclosures of which are totally incorporated by reference.

In embodiments, subsequent to removal of the article from the mandrel, one or more of the following layers may be applied to the article: a charge blocking layer, an adhesive layer, photoconductive layer(s) and an anti-curl layer, and any other layer typically employed in a photoreceptor. Components for each of the layers are as described herein and are illustrated for example in Yu, U.S. Pat. No. 5,167,987, the disclosure of which is totally incorporated by reference. The photoconductive or photosensitive layer may be of the laminate type having separate charge generating and charge transporting layers or may be of the single-layer type. Preferred charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments; indigo pigments such as indigo, thioindigo, and the like; bisbenzoimidazole pigments such as Indofast Orange toner, and the like; phthalocyanine pigments such as copper phthalocyanine, aluminochloro-phthalocyanine, titanyl phthalocyanine, chloro-gallium phthalocyanine, hydroxy-gallium phthalocyanine, vanadyl phthalocyanine, and the like; quinacridone pigments; and azulene compounds. Preferred charge transport materials include compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and the like, aryl amines, and hydrazone compounds. Illustrative photoconductive layers are found in for example Stolka et al., U.S. Pat. No. 4,265,990, the disclosure of which is totally incorporated by reference, which discloses a charge transport layer comprising a polycarbonate resin and an aryl amine. Other typical photoconductive layers include amorphous or alloys of selenium such as selenium-arsenic, selenium-tellurium-arsenic, selenium-tellurium, and the like. The photoconductive layer(s) may be of any suitable thickness. A single layer type photoconductive layer may have a thickness preferably of about 0.1 to about 100 microns. In preferred embodiments, the charge generating and charge transport layers of a laminate type each may have a thickness of about 0.05 microns to about 50 microns.

Some materials can form a layer which functions as both an adhesive layer and charge blocking layer. Typical blocking layers include polyvinylbutyral, organosilanes, epoxy resins, polyesters, polyamides, polyurethanes, silicones, and the like. The polyvinylbutyral, epoxy resins, polyesters, polyamides, and polyurethanes can also serve as an adhesive layer. Adhesive layers, charge blocking layers, anti-curl layers and any other layers conventionally employed in photoreceptors may have an effective thickness, and preferably from about 0.1 to about 20 microns.

The layered materials described herein may be applied by any known technique and apparatus including dip coating, spray coating, electrodeposition, and vapor deposition. Compositions of the layered materials described herein and techniques and apparatus for their application to the article are illustrated in U.S. Pat. Nos. 4,390,611, 4,551,404, 4,588,667, 4,596,754, and 4,797,337, the disclosures of which are totally incorporated by reference.

The entire article, or a portion thereof, may be heated to undergo shrinkage. The heating step may be accomplished on an article which may be uncoated or coated with layered material such as a photoconductive material as described herein. In embodiments, any portion of the article may be heated such as a part of the center region; the heated portion preferably comprises one or both end regions of the article. The precise dimensions of the article's center region and two end regions may change in embodiments. For a cylindrical article, each end region preferably comprises a portion of the article ranging from about 5 mm to about 5 cm adjacent each end.

The article, or portion thereof, may be heated to any effective temperature. It appears that the most shrinkage from the application of, for example, laser energy is accomplished by slightly melting the top surface of the nickel. The surface changes from a dull matte finish to a more shiny surface. The melting temperature of nickel is 2650° F., so it is assumed that the extreme top surface of the nickel article will reach 2650° F. Heating may be accomplished by any effective methods and apparatus. For example, a portion of the article can be subjected to induction heating, especially radio frequency induction heating. Induction heating is accomplished at a frequency ranging for example from about 100 to about 5,000 MHz, and more preferably from about 200 to about 2,000 MHz.

In embodiments, heating may be accomplished by employing laser energy while the article is rotating, preferably from for example a carbon dioxide laser emitting a continuous wave or pulsed laser energy. The laser beam is preferably focused on the metal surface and has an illustrative energy ranging for instance from about 100 to about 2000 watts, and preferably from about 500 to about 1500 watts. In addition, the laser energy residence time on the metal surface may be precisely controlled. This is accomplished by traverse speed of the beam along the axis of the cylinder and the rotational speed of the cylinder which rotates in a range from 100 rpm to 6000 rpm but most preferably from 1000 to 4000 rpm. Traverse speed of the laser beam along the cylinder surface can range from 5 mm per minute to 250 mm per minute and preferably from about 12 mm per minute to 100 mm per minute.

It is believed that the amount of shrinkage can be controlled in embodiments where RF induction heating is utilized by regulating the amount of heat in the heated portion. Accordingly, there may be employed in embodiments of the present invention a thermally conductive, controlled temperature mandrel which is inserted into the article. The controlled temperature mandrel contacts the inner surface of the heated portion of the article and channels excess heat away from the heated portion. The mandrel may be fabricated from a thin (e.g., about 1–5 mm) thermally conductive metal such as aluminum, steel, brass, copper, and the like, and may be at least partially hollow to accommodate a fluid such as water, glycol or other heat transfer medium in an amount ranging for example from about 0.5 to about 3 liters. Temperature sensors and heating apparatus may be coupled to the mandrel to monitor and control the temperature of the mandrel and/or the contained fluid. During the heating of the article, the temperature of the mandrel and/or the contained fluid may range for example from about 0° C. to about 60° C. The inserted mandrel may also function to position and/or rotate the article during heating. In embodiments, a concentrator coil may be employed. In this case, exterior turns wrapped around the cylinderical portion of a concentrator ring force the total current to be concentrated on the inner bore, thus transforming a low heat density setup to a high heat density setup in the exact region where shrinkage is desired. It is believed that the temperature controlled mandrel and/or the concentrator coil may control the exact area and level of desired heating. Concentrator coils are available from Ameritherm Inc. of Scottsville, N.Y. 14546.

The article may be heated using any suitable method and apparatus for a time period ranging for example from about 1 second to about 1 hour, and preferably from about 5 seconds to about 30 minutes.

Heating shrinks the outer cross-sectional dimension of the heated portion by an amount ranging for instance from about 0.05 mm to about 50 mm, and preferably from about 0.07 mm to about 12 mm, and more preferably from about 0. 1 mm to about 5 mm. Preferably, one or both end regions of the article undergo shrinking. Each shrunken portion comprises a length of the article ranging for example from about 1 mm to about 5 cm, and preferably from about 5 mm to about 3 cm.

In FIG. 1, photoreceptor 2 is comprised of cylindrical nickel substrate 4 and layered material 6. A cylindrical flange portion 8 is inserted into an end of substrate 4. The inserted flange portion 8 has an outer cross-sectional dimension slightly smaller than the inner cross-sectional dimension of substrate 4. End region 10 of substrate 4 is heated, and end region 10 shrinks, whereby the outer surface of the flange portion 8 contacts the inner surface of substrate 4. This is one method of "shrink fitting" the photoreceptor with an end flange. The procedure illustrated in FIG. 1 may be repeated with the other end of substrate 4 with another end flange.

In a modification of the procedure illustrated in FIG. 1, the end region of the substrate is heated to shrink the outer cross-sectional dimension of the end region. Then an end flange, having an outer cross-sectional dimension larger than the inner cross-sectional dimension of the shrunken end region, is inserted by pressing into the shrunken end region, thereby expanding the shrunken end. This is another method of "shrink fitting" the photoreceptor with an end flange. In this modification, the end flange portion preferably has an outer cross-sectional dimension ranging from greater than the inner cross-sectional dimension of the shrunken end region of the article to about 10% greater than the inner cross-sectional dimension of the substrate prior to the heating. In a preferred embodiment of this modification of the procedure illustrated in FIG. 1, the end flange portion has an outer cross-sectional dimension of the same or similar size as the inner cross-sectional dimension of the substrate prior to heating; this may result in the surface of the substrate's end region being nearly level or precisely level with the rest of the substrate surface subsequent to positioning of the end flange in the end of the article.

The present invention offers a number of benefits in embodiments. For instance, the instant method minimizes or eliminates the use of adhesives in coupling members in the form of for example end flanges, tubes, rods, bearings, end bells to the ends of articles, especially photoreceptor substrates, thereby simplifying and reducing the cost of fabrication. A secondary advantage of minimizing or eliminating the adhesive is that recycling the article is facilitated since there is a lesser amount or no adhesive to remove. In addition, the present method offers in embodiments a simple and inexpensive way to size articles comprised of nickel and formed by electrodeposition, especially electroforming, such as shafts, belts, rollers, tubes, donor rolls, and precision parts. Also, the instant method may be used to cover a roller, such as one having a knurled surface, with a relatively uniform nickel coating. Furthermore, the instant method may be employed in embodiments as a coupling technique as described herein to join a nickel article to a member such as an end flange, a tube, a rod, a bearing, an end bell, and the like. For instance, where the nickel article is a tube and the member is in the form of a smaller tube, an end region of the member may be inserted into an end of the nickel article and the nickel article is heated to shrink fit the nickel article with the member. Preferably, the member is fabricated from a different material than the nickel article. For example, the member may be fabricated from plastic, aluminum, steel, iron, copper, brass, and the like.

The invention will now be described in detail with respect to specific preferred embodiments thereof, it being understood that these examples are intended to be illustrative only and the invention is not intended to be limited to the materials, conditions or process parameters recited herein. All percentages and parts are by weight unless otherwise indicated.

EXAMPLE 1

A nickel cylinder having an outside diameter of about 40 mm and a wall thickness of about 0.077 mm was prepared under the electroforming bath chemistry and operating conditions as set forth in TABLE I.

EXAMPLE 2

The nickel cylinder of Example 1 was treated with a Model 820 $CO_2$ laser manufactured by Rofin Sinar Corporation of Plymouth, Mich. using the following procedure. The cylinder was mounted on a rotating mandrel using an air bladder which provided an annular air space of about 1 mm to about 2 mm between the mandrel and cylinder. A continuous laser beam having a power of 1400 watts was generated and impinged through a 127 mm focal length lens to focus on the curved surface of the nickel cylinder while same was rotating at 1000 RPM. The point of impingment was 10.5 mm offset from the centerline of the cylinder so that any reflected laser energy could not reflect back into the laser optics. At the instant of impingement, the cylinder was traversed in a direction perpendicular to the beam at a rate of 25 mm/minute parallel to the axis of the cylinder. This process condition was continued for 5 mm along the axis. The cylinder was then removed from the mandrel and the 5 mm band and area adjacent to it on both sides was measured on a Perthen Perthometer Model No. MR4 manufactured by Feinpruef Corporation of Charlotte, N.C. 28217. The resulting measurements showed that the outside diameter of the cylinder had reduced in size by about 268 micrometers.

By reducing the laser power and/or increasing the linear traverse speed so that the watt density is decreased, the amount of shrinkage can be decreased to the desired amount. In the case where an end flange is permanently attached to a nickel cylinderical substrate which is prepared as described in Example 1, 900 watts may be used to provide an about 85 micrometer shrink fit onto the end flange.

EXAMPLE 3

Three nickel cylinders were fabricated in a manner as set forth in Example 1 to result in the following: (1) a nickel cylinder having a bare matte finish, a wall thickness of 0.003inch and an outer diameter of about 84 mm; (2) a nickel cylinder having a bare shiny finish, a wall thickness of 0.003inch, and an outer diameter of about 84 mm; and (3) a nickel cylinder having a bare matte finish, a wall thickness of 0.005inch and an outer diameter of about 84 mm. A shiny finish may be produced by increasing the concentration in the bath composition of Saccharin (up to for example about 300 mg/L) and/or the Leveler (up to for example about 150 mg/L of 2-butyne 1,4-diol). A matte finish (also referred to herein as a "dull finish") may be produced by decreasing the concentration in the bath composition of Saccharin (down to for example about 0 mg/L) and/or the Leveler (down to for example about 0 mg/L of 2-butyne 1,4-diol). A shiny finish may be the result of an increased sulfur and/or carbon content in the nickel cylinder. A shiny finish has a more laminar grain pattern; a matte finish has a more columnar grain pattern.

Selected portions of the nickel cylinders were subjected to laser exposure in a manner similar to Example 2. The operating parameters and the results are set forth in TABLE II. The following general observations can be made from the results in TABLE II greater laser exposure via higher wattage and/or slower rpm may produce greater nickel shrinkage up to a certain point; and a shiny finish may shrink more than a matte finish.

EXAMPLE 4

Three identical nickel cylinders (also referred to herein as "sleeve no. 1,""sleeve no. 2," and "sleeve no. 3") having a wall thickness of about 0.002 inch (50 microns) and an outside diameter of about 84 mm were fabricated in a manner as set forth in Example 1. Selected portions of sleeve no. 1, sleeve no. 2, and sleeve no.3 were subjected to laser exposure in a manner similar to Example 2, with the operating parameters and the measured physical characteristics as set forth in TABLE III and TABLE IV, and TABLE V respectively. In TABLE III and TABLE IV, the test samples were not cut in the dogbone shape. The samples were tested as a straight sample and as a result of that the break was sometimes at the jaw and not in the center of the sample. The hardness readings were from a separate piece cut from the same sample, not from the ultimate strength pull sample. In the TABLES III, IV, and V, the following terms are defined: "ipm" (inches per minute) refers to the traverse rate; "control" refers to a portion of the nickel sleeve which was not subjected to laser exposure; and "pass" refers to the number of times the same portion of the nickel sleeve was subjected to laser exposure at the same laser wattage, revolutions per minute ("rpm"), and ipm (note that a portion which was subjected to for instance 1 pass was a different portion of the sleeve than a portion which was subjected to for instance 4 passes).

The following general observations can be made from the results in TABLES III, IV, and V: the physical characteristics of the nickel sleeve change upon greater laser exposure via for example a slower revolutions per minute as seen for the 1 pass samples of TABLE III and the 1 pass sample of TABLE IV; greater laser exposure via slower rpm and/or more passes may produce greater nickel shrinkage as seen in TABLE V; and the physical characteristics of sleeve no. 2 as seen in TABLE IV remained generally unchanged among the samples representing the control sample, the 1 pass sample, and the 4 pass sample even though there was a significant amount of shrinkage between the 1 pass sample and the 4 pass sample of TABLE V, which involved the same laser wattage, revolutions per minute, and traverse rate.

Other modifications of the present invention may occur to those skilled in the art based upon a reading of the present disclosure and these modifications are intended to be included within the scope of the present invention.

TABLE I

|  | MOST PRE-FERRED |
|---|---|
| A. MAJOR ELECTROLYTE CONSTITUENTS: |  |
| Nickel Sulfamate - as $Ni^{+2}$, 8–16 oz/gal. (60–120 g/L) | 11.5 oz/gal. |
| Chloride - as $NiCl_2.6H_2O$, 1.0–7 oz/gal. (7.5–52.5 g/L) | 2.5 oz/gal. |
| Boric Acid - 5.0–5.4 oz/gal. (37.5–40.5 g/L) | 5 oz/gal. |
| pH - 3.85–4.05 at 23° C. | 3.95 |
| Surface Tension - at 136° F., 32–37 d/cm using Sodium Lauryl Sulfate (about 0.00525 g/l). | 35 d/cm. |
| Saccharin - 0–300 mg/L, as Sodium Benzosulfimide | 75 mg/L. |

TABLE I-continued

|  | MOST PRE-FERRED |
|---|---|
| dihydrate |  |
| Leveler - 0–150 mg/L as 2-butyne 1,4-diol | 70 mg/L. |
| B. IMPURITIES: |  |
| Aluminum - 0–20 mg/L. | 0 mg/L. |
| Ammonia - 0–400 mg/L. | 0 mg/L. |
| Arsenic - 0–10 mg/ L. | 0 mg/L. |
| Azodisulfonate - 0–50 mg/L. | 0 mg/L. |
| Cadmium - 0–10 mg/L. | 0 mg/L. |
| Calcium - 0–20 mg/L. | 0 mg/L. |
| Hexavalent Chromium - 4 mg/L maximum. | 0 mg/L. |
| Copper - 0–25 mg/L. | 0 mg/L. |
| Iron - 0–250 mg/L. | 0 mg/L. |
| Lead - 0–8 mg/L. | 0 mg/L. |
| MBSA - (2 - Methyl Benzene Sulfonamide) - 0–2 mg/L. | 0 mg/L. |
| Nitrate - 0–10 mg/L. | 0 mg/L. |
| Organics - Depends on the type, however, all known types need to be minimized. | 0 mg/L. |
| Phosphates - 0–10 mg/L. | 0 mg/L. |
| Silicates - 0–10 mg/L. | 0 mg/L. |
| Sodium - 0–0.5 gm/L. | 0 mg/L. |
| Sulfate - 0–2.5 g/L. | 0 mg/L. |
| Zinc - 0–5 mg/L. | 0 mg/L. |
| C. OPERATING PARAMETERS: |  |
| Agitation Rate - 4–6 Linear ft/sec solution flow over the cathode surface. | 6 Linear ft/sec. |
| Cathode (Mandrel) - Current Density, 50–600 ASF (amps per square foot). | 250 ASF. |
| Ramp Rise - 0 to operating amps in 0 to 15 min. ± 2 sec. | 1 min. |
| Plating Temperature at Equilibrium - 130–155° F. | 140° F. |
| Anode - Electrolytic, Depolarized, or Carbonyl Nickel. | Carbonyl Nickel. |
| Anode to Cathode Surface Area Ratio - 0.5–4:1. | 1.5:1. |
| Mandrel Core - Aluminum, Zinc, Lead, Cadmium, or Stainless Steel. | Aluminum. |
| Mandrel Surface - Stainless Steel, Chromium, Nickel, Nickel Alloys. | Chromium. |

TABLE II

| NICKEL CYLINDER DESCRIPTION | WATTAGE AT LASER OUTPUT | "DWELL TIME"* | CHANGE IN OUTER RADIUS micron (inch) | COMMENTS (NI MELT POINT PUBLISHED AT 2650° F.) |
|---|---|---|---|---|
| .003" Wall Matte finish Bare | 900 W | 4000 RPM | ~9u (~.00035") |  |
| .003" Wall Matte finish Bare | 900 W | 2000 RPM | ~20u (~.0008") |  |
| .003" Wall Matte finish Bare | 900 W | 1000 RPM | ~54u (~.0021") | SURFACE MELT |
| .003" Wall Matte finish Bare | 1000 W | 1000 RPM | ~54u (~.0021") | SURFACE MELT |
| .003" Wall Matte finish Bare | 1100 W | 1000 RPM | ~66u (~.0026") | SURFACE MELT |
| .003" Wall Matte finish Bare | 1200 W | 1000 RPM | ~72u (~.0028") | SURFACE MELT |
| .003" Wall Shiny finish Bare | 900 W | 4000 RPM | ~8u (~.00031") |  |
| .003" Wall Shiny finish Bare | 1200 W | 1000 RPM | ~134u (~.0052") | SURFACE MELT |
| .003" Wall Shiny finish Bare | 1300 W | 1000 RPM | ~134u (~.0052") | SURFACE MELT |
| .003" Wall Shiny finish Bare | 1400 W | 1000 RPM | ~134u (~.0052") | SURFACE MELT |
| .003" Wall Shiny finish Bare | 1500 W | 1000 RPM | ~134u (~.0052") | SURFACE MELT |
| .005" Wall Matte finish Bare | 900 w | 4000 RPM | ~16u (~.00066") |  |
| .005" Wall Matte finish Bare | 1500 W | 1000 RPM | ~45u (~.018") | SURFACE MELT |

*Reported as and related to rotational speed. A complimentary beam traverse rate, for each rotational speed was used, to hold the laser spot coverage per revolution as a constant.

TABLE III

| SLEEVE THICKNESS IN./DIA. MM | SLEEVE NO./ DESCRIPTION | ULTIMATE STRENGTH LBS/SQ IN. | YIELD STRENGTH LBS/SQ IN. | ELONGATION IN./IN. | HARDNESS ROCKWELL | WHERE SAMPLE BROKE |
|---|---|---|---|---|---|---|
| .002/84 | 1/CONTROL | 241,700 | 150,000 | .0525 | 38.6, 39.8, 38.4 | TOP |
| .002/84 | 1/CONTROL | 239,700 | 150,000 | .0525 | SAME | TOP |
| .002/84 | 1/CONTROL | 235,500 | 160,000 | .0450 | SAME | TOP |
| .002/84 | 1/1 pass, 1500 w, 500 rpm, 1 ipm | 60,000 | TEAR NO DATA | TEAR NO DATA | 14.2, 9.1, 13.1 | MID |
| .002/84 | 1/1 pass 1500 w 500 rpm 1 ipm | 60,000 | TEAR NO DATA | TEAR NO DATA | 12.4, 15.1, 15. | MID |
| .002/84 | 1/CONTROL | 243,400 | 155,000 | .0575 | SAME AS ABOVE CONTROL | TOP |

TABLE IV

| SLEEVE THICKNESS IN./DIA. MM | SLEEVE NO./ DESCRIPTION | ULTIMATE STRENGTH LBS/SQ IN. | YIELD STRENGTH LBS/SQ IN. | ELONGATION IN./IN. | HARDNESS ROCKWELL | WHERE SAMPLE BROKE |
|---|---|---|---|---|---|---|
| .002/84 | 2/CONTROL | 238,500 | 155,000 | .0425 | 39.7, 38.9, 38.6 | TOP |
| .002/84 | 2/1 pass 1500 w 1000 rpm 1 ipm | 242,200 | 160,000 | .0625 | 38, 37.5, 38.7 | BOT |
| .002/84 | 2/4 pass 1500 w 1000 rpm 1 ipm | 238,000 | 155,000 | .0559 | 34.1, 35.5, 38. | MID |
| .002/84 | 2/CONTROL | 212,700 | 160,000 | .0425 | SAME AS CONTROL ABOVE | TOP |

TABLE V (Change in Diameter of Sleeve No. 3)

| Measurement Sleeve No. 3 | 1 Pass 1500 w 1000 RPM 1 IPM | 2 Pass 1500 w 1000 RPM 1 IPM | 3 Pass 1500 w 1000 RPM 1 IPM | 4 Pass 1500 w 1000 RPM 1 IPM | 10 Pass 1500 w 1000 RPM 1 IPM | 1 Pass 1500 w 750 RPM 1 IPM |
|---|---|---|---|---|---|---|
| #1 | 0.0095" (242μ) | 0.0096" (243μ) | 0.0096" (243μ) | 0.0135" (343μ) | 0.0143" (364μ) | 0.0115" (293μ) |
| #2 | 0.0091" (232μ) | 0.0092" (233μ) | 0.0093" (236μ) | 0.0130" (330μ) | 0.0143" (363μ) | 0.0107" (271μ) |
| AVERAGE | 0.0093" (237μ) | 0.0094" (238μ) | 0.0094" (238μ) | 0.0132" (336μ) | 0.0143" (364μ) | 0.0111" (282μ) |

We claim:

1. A method comprising:
   (a) heating a portion of an electroformed hollow cylinder, wherein the cylinder is comprised of nickel and possesses an internal stress sufficient to shrink the diameter of the cylinder upon application of heat, thereby shrinking the diameter of the heated portion; and
   (b) positioning a part of a member in the portion of the cylinder to be subjected to the heating prior to the shrinkage of the cylinder portion, wherein subsequent to the heating the inner surface of the shrunken cylinder portion contacts the outer surface of the member part.

2. The method of claim 1, wherein the cylinder is electroformed prior to the heating with an internal stress ranging from about −1 to about −5,000 pounds per square inch.

3. The method of claim 1, wherein the cylinder is electroformed prior to the heating with an internal stress ranging from about −100 to about −2,000 pounds per square inch.

4. The method of claim 1, further comprising depositing photoconductive material on the cylinder prior to the heating.

5. The method of claim 1, wherein the heating is accomplished by laser energy.

6. The method of claim 1, wherein the heating is accomplished by induction heating.

7. The method of claim 1, wherein the cylinder has a shiny surface finish.

8. The method of claim 1, wherein the cylinder has a dull matte surface finish.

9. The method of claim 1, wherein the heated portion is an end region of the cylinder.

10. A method comprising:
   (a) heating a portion of an electroformed hollow cylinder, wherein the cylinder is comprised of nickel and possesses an internal stress sufficient to shrink the diameter of the cylinder upon application of heat, thereby shrinking the diameter of the heated portion; and
   (b) positioning subsequent to the heating a part of a member in the shrunken portion of the cylinder, wherein the part of the member has a width larger than the inner diameter of the shrunken end portion, thereby expanding the shrunken portion of the cylinder.

11. The method of claim 10, wherein the cylinder is electroformed prior to the heating with an internal stress ranging from about −1 to about −5,000 pounds per square inch.

12. The method of claim 10, wherein the cylinder is electroformed prior to the heating with an internal stress ranging from about −100 to about −2,000 pounds per square inch.

13. The method of claim 10, further comprising depositing photoconductive material on the cylinder prior to the heating.

14. The method of claim 10, wherein the heating is accomplished by laser energy.

15. The method of claim 10, wherein the heating is accomplished by induction heating.

16. The method of claim 10, wherein the cylinder has a shiny surface finish.

17. The method of claim 10, wherein the cylinder has a dull matte surface finish.

18. The method of claim 10, wherein the heated portion is an end region of the cylinder.

* * * * *